June 30, 1925.
A. McD. McAFEE
PREPARATION OF BAUXITE
Original Filed March 10, 1922
1,543,934
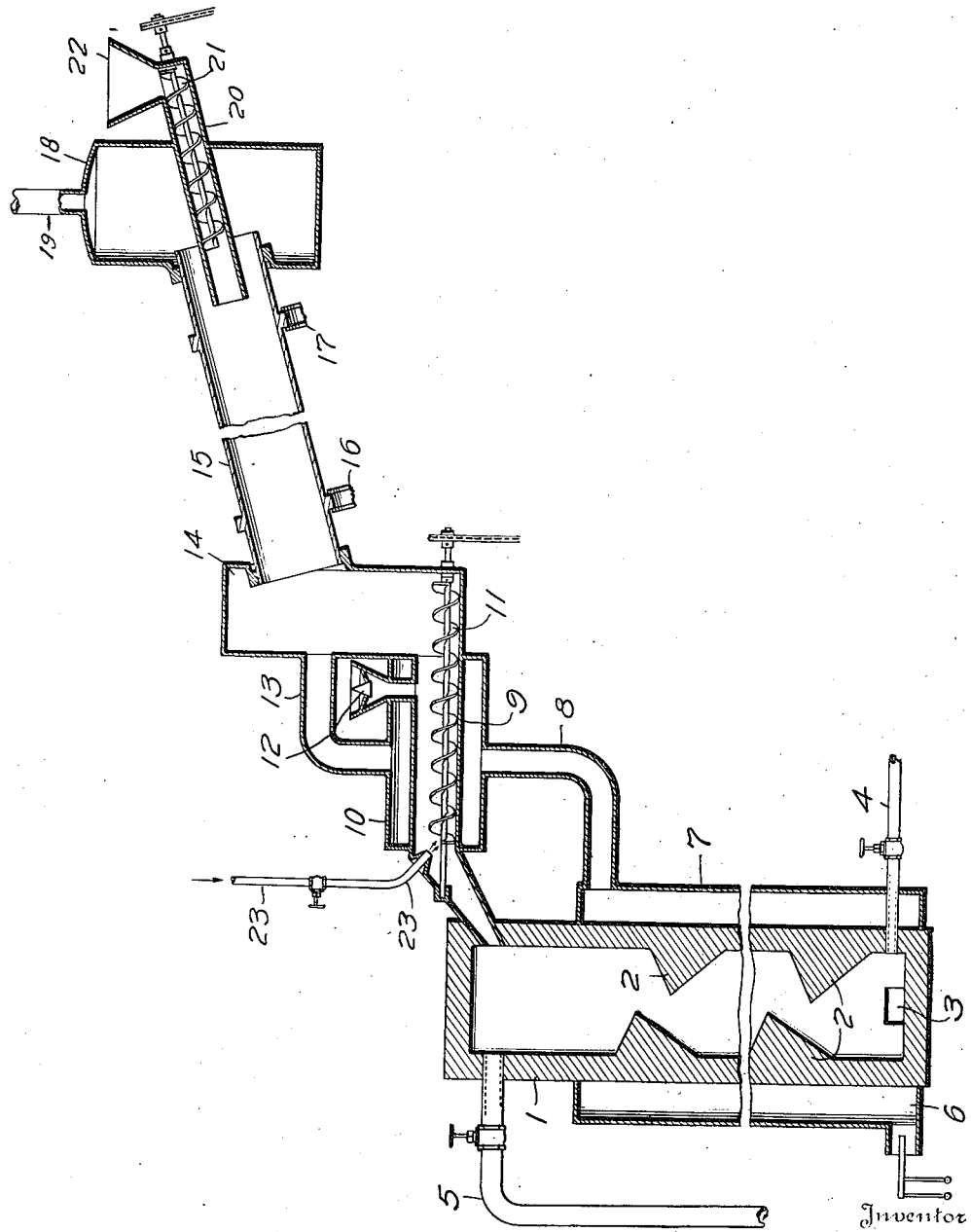
Inventor
A. McD. McAFEE,
By K. P. McElroy Patented June 30, 1925.

1,543,934

UNITED STATES PATENT OFFICE.

ALMER McDUFFIE McAFEE, OF PORT ARTHUR, TEXAS, ASSIGNOR TO GULF REFINING COMPANY, OF PITTSBURGH, PENNSYLVANIA, A CORPORATION OF TEXAS.

PREPARATION OF BAUXITE.

Application filed March 10, 1922, Serial No. 542,592. Renewed April 29, 1925.

*To all whom it may concern:*

Be it known that I, ALMER MCDUFFIE MCAFEE, a citizen of the United States, residing at Port Arthur, in the county of Jefferson and State of Texas, have invented certain new and useful Improvements in the Preparation of Bauxite, of which the following is a specification.

This invention relates to preparation of bauxite; and it comprises a method wherein alumina is dehydrated and activated by a preliminary heating, usually at about 700° F. or above and usually by direct contact with fire gases carrying but little oxygen, and then is exposed to carbon-containing gases under conditions producing a deposition of intimately commingled carbon; all as more fully hereinafter set forth and as claimed.

Aluminum chlorid has long been made by exposure of a hot mixture of alumina and carbon to the action of gaseous chlorin. Vapors of aluminum chlorid are made and separated by condensation from the accompanying carbon monoxid formed from the oxygen of the alumina by a well known reaction. While this manufacture is simple enough in theory, it is attended with considerable difficulty in practice; the difficulties being largely due to slow reactivity in the materials. This necessitates work at a relatively high temperature in order to quicken the action and as the operation, like any other in which soilds are converted into vapors and gases, consumes considerable heat, much heat must be delivered to the sphere of reaction at a high temperature plane, creating apparatus troubles.

I have discovered that the manufacture can be considerably simplified and quickened by the expedient of presenting the materials to the chlorin in a more reactive condition.

Beauxite is the cheapest commercial form of alumina. It may be considered as a more or less impure form of aluminum hydrate; a chemical combination of aluminum oxid with water of hydration. This water is held with considerable tenacity and though it may be quickly expelled by a high heat, it may be quickly expelled by a high heat, in so doing the alumina is shrunk and hardened and rendered much less reactive with chemicals, including chlorin. High heating in dehydration is however the regular practice. I have found that by prolonged heating at a comparatively moderate temperature, and particularly when exposed to a changing atmosphere to carry away the water vapor as fast as liberated, the water can be as effectually expelled without this deleterious change occurring. Ordinarily, I use a temperature around 700° F. to 900° F. Under these conditions the water is removed without, so to speak, injuring the chemical activity of the aluminum oxid or producing a material shrinkage; the bonds or chemical valences which held the water molecule are still in existence. Unshrunk alumina so dehydrated readily takes up chlorin or any other chemically active gas by "adsorption"; it is a highly adsorptive, readily reactive material. Exposed to an atmosphere of chlorin, it condenses or takes up a considerable volume of the gas, holding it in a condition to make it available for forming aluminum chlorid. The water being removed from the alumina without any substantial shrinkage or condensation of the same, the alumina is left in a highly pervious or porous condition, presenting a large area of adsorptive surface.

In another and copending prior application, Serial No. 531,612, I have described and claimed a method of making aluminum chlorid wherein the stated facts are utilized; bauxite being dehydrated at a low temperature to free it of water and make it reactive with gases. In the process described and claimed in the said application a similar treatment is applied to carbon admixed with the bauxite; the carbon being freed of moisture and adsorbed gases ("activated") at the same time as the alumina with which it is mixed. I have found, however, that a material still more reactive with chlorin in making chlorid can be obtained by the expedient of depositing more or less carbon in the pores of the bauxite itself, simultaneously with or immediately after dehydration. All the carbon necessary for the reaction can be so deposited or merely some of it.

There are many gases and vapors from which carbon can be deposited in finely divided form by the action of solid catalysts. One such gas is ordinary producer gas containing CO. CO is formed from solid carbon by $CO_2$ with absorption of heat; and in contact with catalysts the CO tends to revert to $CO_2$ with deposition of carbon and evolution of heat. Many of the hydrocarbon gases, such as are contained in "still gases" of petroleum refineries also tend to deposit carbon, usually with liberation of hydrogen, in contact with catalysts. The carbon deposited from a gas by a catalyst is in actual contact with the catalyst surfaces; the molecules of carbon and of catalyst are in close juxtaposition. Dehydrated or partially dehydrated reactive alumina is a catalyst capable of effecting these actions and the iron oxid, which is invariably present in bauxite, is still more energetic in producing this result.

In the present invention, as in the prior application, I first dehydrate the bauxite more or less completely by contact with neutral fire gases or in another suitable way. It is an advantageous way of operating to pass the bauxite slowly downward through a rotary inclined kiln against a counter-current of neutral fire gases. These fire gases need not be of high temperature and may be derived from the heating means of the aluminum chlorid generators. With the alumina, carbon may or may not be mingled. Ordinarily I use some carbon in admixture with the bauxite if only for the sake of keeping the charge open in the dehydrating operation. Dehydration is usually performed at a temperature around 700° F. with a rapidly changing atmosphere of gases passing up the kiln. According to the present invention the hot bauxite, with or without accompanying carbon, is next exposed to a counter-current of a gas capable of depositing carbon. This may be, as stated, producer gas; but ordinarily I employ still gases or other hydrocarbon gases. The gas is broken up with deposition of fine carbon in the pores of the bauxite; this carbon being in a highly reactive condition and in actual contact with the alumina. The waste gases coming from the deposition I generally pass upward through the kiln to aid in dehydration. All the carbon necessary for chemical reaction with the chlorin and bauxite may be catalytically deposited in the material.

Some measure of the advantages of this invention may be attained by simply performing the dehydration with a smoky flame or flame gases. In so doing instead of forming an atmosphere of neutral fire gases in the kiln, the kiln may be simply heated with a smoky flame or smoky flame gases; using a "reducing atmosphere." In so doing much of the deposition of the carbon is within the pores of the bauxite and is simultaneous with the expulsion of the moisture of hydration. But commonly, I find it better to perform the dehydration and the impregnation with carbon as separate stages.

While the carbon-impregnated activated bauxite reacts with chlorin with extraordinary readiness, probably due to the fact that it adsorbs much of the gas at once, yet a certain amount of heat must be supplied. This heat may be supplied in any of the usual ways and the chlorination may take place in any of the usual types of apparatus. It is a convenient expedient however to develop the necessary heat in the action itself, admixing a certain amount of non-oxidized aluminum material with the bauxite. Such material may be aluminum itself, as in using aluminum dross or it may be a non-oxidized compound of aluminum, such as aluminum carbid, nitrid, sulfid, etc. Aluminum and its carbid, etc. react with chlorin to form aluminum chlorid with a great evolution of heat; and a small proportion of aluminum dross, etc. admixed with bauxite and carbon will furnish all the heat necessary for the action. When these admixtures are used they may be simply mingled with the bauxite and sent through the process with it. It is, however, generally more convenient to add the aluminum, etc. after the activation and just before chlorination.

Internally generated heat for carrying on the action may be afforded by using a little air with the chlorin instead of a little aluminum with the bauxite. In so doing it is merely necessary to use a slightly larger amount of carbon in the charge.

In the accompanying illustration I have shown, more or less diagrammatically, certain apparatus embodying the described invention and capable of use in the performance of the described process. In this showing, the figure is a view in central vertical section, certain parts being shown in elevation.

In this showing, element 1 is a vertical reaction chamber provided with angled shelves 2 of the type of those used in a "shaft-and-shelf furnace;" these serving to produce a retarded flow of pulverulent material through the furnace. At the bottom is manhole 3 for removing solids unacted upon, such as coke, ash, etc. Chlorin or chlorin containing gas with heated air or oxygen is introduced through conduit 4 and aluminum chlorid vapors are removed at the top through conduit 5, being sent to a condensing plant (not shown). Heat is provided by furnace chamber 6 having heating flue 7 encircling the vertical retort. From this flue the fire gases, now reduced in temperature, pass through duct 8 and surround conduit 9 in heating casing 10. This conduit contains a mixing screw conveyor 11 and is provided with hopper 12 for the addition of metallic aluminum (which may be added as "aluminum dross"), aluminum carbid, etc. From this jacket, the fire gases, now still further reduced in temperature, pass through conduit 13, their temperature now being around 700° F. This conduit enters stationary housing 14 enclosing the lower end of rotary inclined kiln 15 provided with the usual driving and supporting means 16 and 17. At the upper end, the kiln enters stationary housing 18 provided with stack 19 and feeding conduit 20, containing a screw conveyor 21, and supplied with a mixture of carbon and bauxite from hopper 22.

As so far described, the apparatus is similar to that shown in said copending application. In the best embodiment of the present invention now known to me, however, I add to this apparatus a special gas inlet 23, opening into the screw conveyor casing taking alumina and carbon to the chlorinating chamber. Through this inlet a carbon-depositing gas (producer gas, still gas, etc.) is supplied. Other types of apparatus may be used and gas introduction may be at another point; but the apparatus shown is simple and convenient. The conveyor casing 9 to the right of the gas inlet I make of somewhat ample cross section to permit ready flow of gas backwards against the advancing solids, coning the casing down at the point of delivery into the chlorinating chamber, and thereby forming a gas seal.

The operation of this apparatus is obvious from the description. Bauxite, with or without coke, is delivered into the kiln by means of 22, 20 and 21, and passes down slowly therethrough against an opposing current of neutral fire gases entering at a temperature of about 700° to 900° F. The material in its slow passage down the kiln is dehydrated and activated in the manner described but is not shrunk or condensed. From the lower end of the kiln it is taken by screw conveyor and passed through the heated conduit 9, where such amounts of exothermic bodies as may be desired may be added at 12. Gas enters at 23 and passes backward through 9, depositing carbon in the material and finally joins the fire gases in 14. The solid carbon charged material passes into the upright retort 1 and tumbles down therethrough against an opposing current of chlorin, with or without oxygen-containing gas, entering at 4. Solid residues are removed at 3 while aluminum chlorid passes as vapor through 5 to a condenser (not shown).

Many other forms of apparatus than that shown may be employed in practicing the present invention; but the form shown is simple, operative and economical. I regard, however my invention as covering any method of producing hydrated aluminum oxid and intimately associated carbon, wherein the alumina is freed of water, gases and volatiles by a prolonged heating at a comparatively low temperature; a temperature insufficient to shrink, harden and condense the alumina rendering it less active chemically, and the alumina is then impregnated with carbon by deposition from a gas containing the same.

What I claim is:—

1. In the preparation of bauxite for the manufacture of aluminum chlorid therefrom the process which comprises dehydrating the bauxite at a temperature below that at which substantial shrinkage takes place and then catalytically depositing carbon in its pores.

2. In the preparation of bauxite for the manufacture of aluminum chlorid therefrom the process which comprises dehydrating the bauxite at a temperature below that at which substantial shrinkage takes place and then catalytically depositing carbon in its pores by exposure to hydrocarbon gases at a high temperature.

3. In the preparation of bauxite for the manufacture of aluminum chlorid therefrom the process which comprises dehydrating and heating bauxite by contacting the same with products of combustion under conditions precluding shrinkage and thereafter exposing the hot bauxite to hydrocarbon gases.

In testimony whereof, I have hereunto affixed my signature.

ALMER McDUFFIE McAFEE.